US009294834B2

(12) United States Patent
Liu et al.

(10) Patent No.: US 9,294,834 B2
(45) Date of Patent: Mar. 22, 2016

(54) METHOD AND APPARATUS FOR REDUCING NOISE IN VOICES OF MOBILE TERMINAL

(71) Applicant: Huawei Device Co., LTD, Shenzhen (CN)

(72) Inventors: Hongtao Liu, Xi'an (CN); Xiaopeng Zhang, Xi'an (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 332 days.

(21) Appl. No.: 13/873,715

(22) Filed: Apr. 30, 2013

(65) Prior Publication Data
US 2013/0343560 A1  Dec. 26, 2013

(30) Foreign Application Priority Data
Jun. 25, 2012  (CN) .......................... 2012 1 0212039

(51) Int. Cl.
| H04R 1/10 | (2006.01) |
| H04R 3/00 | (2006.01) |
| H04M 1/19 | (2006.01) |
| H04M 1/60 | (2006.01) |

(52) U.S. Cl.
CPC . *H04R 3/00* (2013.01); *H04M 1/19* (2013.01); *H04R 1/1083* (2013.01); *H04R 3/005* (2013.01); *H04M 1/6058* (2013.01); *H04R 2201/107* (2013.01); *H04R 2410/05* (2013.01)

(58) Field of Classification Search
CPC .............................. H04R 5/033; H04R 1/1041
USPC ......................................................... 381/74
See application file for complete search history.

(56) References Cited

U.S. PATENT DOCUMENTS

| 7,146,013 | B1* | 12/2006 | Saito et al. ...................... 381/92 |
| 2005/0060142 | A1 | 3/2005 | Visser et al. |
| 2007/0237338 | A1* | 10/2007 | Konchitsky ..................... 381/91 |
| 2008/0044036 | A1 | 2/2008 | Konchitsky |

(Continued)

FOREIGN PATENT DOCUMENTS

| CN | 2395470 Y | 9/2000 |
| CN | 101420491 A | 4/2009 |

(Continued)

OTHER PUBLICATIONS

First Office Action of Chinese Application No. 201210212039.0 mailed Jun. 20, 2013, 12 pages. (Partial Translation).

(Continued)

*Primary Examiner* — Simon King
(74) *Attorney, Agent, or Firm* — Slater & Matsil, L.L.P.

(57) ABSTRACT

The present invention discloses a method and an apparatus for reducing noise in voices of a mobile terminal and relates to the field of communications technologies, which can improve the effect of noise reduction. The method includes: selecting, from a voice headphone and a microphone built in the mobile terminal, a current communicating microphone and a current noise reducing microphone; obtaining an audio signal received by the current communicating microphone and an audio signal received by the current noise reducing microphone; performing noise reduction according to the audio signal received by the current communicating microphone and the audio signal received by the current noise reducing microphone, so as to obtain a noise reduced signal; and performing voice coding according to the noise reduced signal to generate an audio output signal.

20 Claims, 5 Drawing Sheets

(56) References Cited

U.S. PATENT DOCUMENTS

| | | |
|---|---|---|
| 2008/0280653 A1 | 11/2008 | Ma et al. |
| 2008/0298599 A1 | 12/2008 | Kim |
| 2009/0023479 A1* | 1/2009 | Hulvey ............... H04M 1/6066 455/569.1 |
| 2009/0238377 A1 | 9/2009 | Ramakrishnan et al. |
| 2012/0163623 A1* | 6/2012 | Konchitsky .................... 381/92 |
| 2014/0205109 A1* | 7/2014 | Theiler ................ H04R 1/1083 381/74 |

FOREIGN PATENT DOCUMENTS

| | | |
|---|---|---|
| CN | 101827146 A | 9/2010 |
| CN | 101848288 A | 9/2010 |
| CN | 102111468 A | 6/2011 |
| CN | 102368793 A | 3/2012 |
| CN | 102800323 A | 11/2012 |
| KR | 100553557 B1 | 2/2006 |
| KR | 100739178 | 7/2007 |
| KR | 20080104667 A | 12/2008 |

OTHER PUBLICATIONS

International Search Report received in Application No. PCT/CN2013/073107 mailed May 30, 2013, 11 pages.

Extended European Search Report received in Application No. 13165077.2-1858 mailed Sep. 24, 2013, 9 pages.

* cited by examiner

METHOD AND APPARATUS FOR REDUCING NOISE IN VOICES OF MOBILE TERMINAL

CROSS-REFERENCE TO RELATED APPLICATIONS

This application claims priority to Chinese Patent Application No. 201210212039.0, filed on Jun. 25, 2012, which is hereby incorporated by reference in its entirety.

FIELD OF THE INVENTION

The present invention relates to the field of communications technologies, and in particular, to a method and an apparatus for reducing noise in voices of a mobile terminal.

BACKGROUND OF THE INVENTION

Currently, a dual microphone noise reduction technology is used for most mobile terminals in the market. Dual microphone noise reduction means that two microphones are built in a handset, one for clear voice communication and the other for active physical noise reduction where ambient sounds are collected and processed and then a sound wave with an inverted phase to the noise is generated to reduce the noise by using an offsetting principle.

Due to the size of the mobile terminal, it is impossible to place a noise reduction microphone far from a main microphone. Therefore, when noise is filtered, some useful sounds are also filtered, thereby affecting the quality of voice communication and weakening the effect of noise reduction.

SUMMARY OF THE PRESENT INVENTION

Embodiments of the present invention provide a method and an apparatus for reducing noise in voices of a mobile terminal, which can improve the effect of noise reduction.

To achieve the above objective, the embodiments of the present invention adopt the following technical solutions:

A method for reducing noise in voices of a mobile terminal includes:

selecting, from a voice headphone and a microphone built in the mobile terminal, a current communicating microphone and a current noise reducing microphone;

obtaining an audio signal received by the current communicating microphone and an audio signal received by the current noise reducing microphone;

performing noise reduction according to the audio signal received by the current communicating microphone and the audio signal received by the current noise reducing microphone, so as to obtain a noise reduced signal; and performing voice coding according to the noise reduced signal to generate an audio output signal.

A mobile terminal includes:

a selecting unit, configured to select, from a voice headphone and a microphone built in the mobile terminal, a current communicating microphone and a current noise reducing microphone;

an obtaining unit, configured to obtain an audio signal received by the current communicating microphone selected by the selecting unit and an audio signal received by the current noise reducing microphone selected by the selecting unit;

a noise reducing unit, configured to perform noise reduction according to the audio signal received by the current communicating microphone and the audio signal received by the current noise reducing microphone that are obtained by the obtaining unit, so as to obtain a noise reduced signal; and a voice coding processing unit, configured to perform voice coding according to the noise reduced signal generated by the noise reducing unit, so as to generate an audio output signal.

With the method and apparatus for reducing noise in voices of a mobile terminal provided in the embodiments of the present invention, by selecting, from a voice headphone and a microphone built in the mobile terminal, a communicating microphone and a noise reducing microphone, a certain distance is produced between the communicating microphone and the noise reducing microphone, thus reducing the probability of filtering out useful voice information, ensuring the quality of voice communication, and improving the effect of noise reduction.

BRIEF DESCRIPTION OF THE DRAWINGS

To describe the technical solutions in the embodiments of the present invention or in the prior art more clearly, the following briefly introduces the accompanying drawings needed for describing the embodiments. Apparently, the accompanying drawings in the following descriptions show merely some embodiments of the present invention, and persons of ordinary skill in the art may still derive other drawings from the accompanying drawings without creative efforts.

DETAILED DESCRIPTION OF THE EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
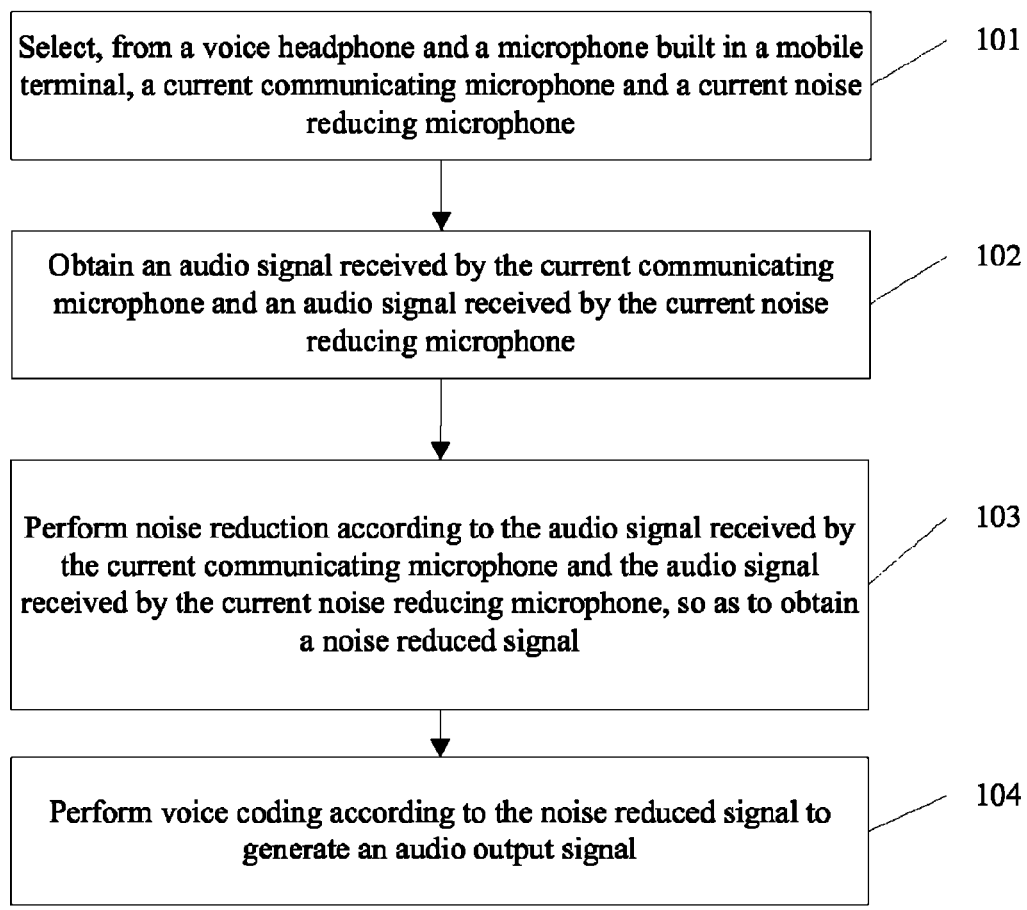
FIG. 1 is a flowchart of a method for reducing noise in voices of a mobile terminal according to Embodiment 1 of the present invention.

Embodiment 1 of the present invention provides a method for reducing noise in voices of a mobile terminal, which is applicable to devices with voice communication functions such as handsets and tablet computers. As shown in FIG. 1, the method includes:

101. Select, from a voice headphone and a microphone built in the mobile terminal, a current communicating microphone and a current noise reducing microphone.

The voice headphone is connected to a handset in a wired or wireless manner.

The selecting, from a voice headphone and a microphone built in the mobile terminal, a current communicating microphone and a current noise reducing microphone may be implemented in two methods, specifically:

Method 1: Obtain the audio signal received by the voice headphone and the audio signal received by the microphone built in the mobile terminal; obtain the audio energy corresponding to the audio signal received by the voice headphone and the audio energy corresponding to the audio signal received by the microphone built in the mobile terminal; compare the audio energy corresponding to the audio signal received by the voice headphone with the audio energy corresponding to the audio signal received by the microphone built in the mobile terminal, and determine greater one audio energy and smaller audio energy in the audio energy corresponding to the audio signal received by the voice headphone and the audio energy corresponding to the audio signal received by the microphone built in the mobile terminal; and select the microphone that receives the audio signal corresponding to the greater audio energy as the current communicating microphone and the microphone that receives the audio signal corresponding to the smaller audio energy as the current noise reducing microphone.

It should be noted that the technical steps provided by the method 1 are performed by the handset automatically after the voice function is enabled and do not need to be set manually by a handset user.

Further, in the method 1, the step of obtaining the audio energy corresponding to the audio signal received by the voice headphone and the audio energy corresponding to the audio signal received by the microphone built in the mobile terminal is implemented specifically as follows:

In each sampling period of a sampling time window, perform analog-to-digital conversion on the audio signal received by the voice headphone to obtain the sample audio signal of the voice headphone corresponding to each sampling period and perform analog-to-digital conversion on the audio signal received by the microphone built in the mobile terminal, so as to obtain the sample audio signal of the microphone built in the mobile terminal corresponding to each sampling period, where the sampling time window includes at least one sampling period; calculate according to the sample audio signal of the voice headphone corresponding to each sampling period, so as to obtain the one-period audio energy of the voice headphone corresponding to each sampling period and calculate according to the sample audio signal of the microphone built in the mobile terminal corresponding to each sampling period, so as to obtain the one-period audio energy of the microphone built in the mobile terminal corresponding to each sampling period; determine a sum of the one-period audio energy of the voice headphone corresponding to all sampling periods as the audio energy of the audio signal received by the voice headphone and determine a sum of the one-period audio energy of the microphone built in the mobile terminal corresponding to all sampling periods as the audio energy of the audio signal received by the microphone built in the mobile terminal; or determine a mean value of the one-period audio energy of the voice headphone corresponding to all sampling periods as the audio energy of the audio signal received by the voice headphone and determine a mean value of the one-period audio energy of the microphone built in the mobile terminal corresponding to all sampling periods as the audio energy of the audio signal received by the microphone built in the mobile terminal.

The sampling time window may have one or more than one sampling period and each sampling period may be set to 20 ms. There may be other settings which are not limited by the embodiment of the present invention.

It should be noted that the analog-to-digital conversion is to convert the analog signal received by a microphone to a digital signal through four steps including sampling, holding, quantization, and coding, for example, the converting the audio signal received by the voice headphone to a sample audio signal of the voice headphone and the converting the audio signal received by the microphone built in the mobile terminal to a sample audio signal of the microphone built in the mobile terminal. After the analog-to-digital conversion, calculation may be performed on the digital signal obtained by the analog-to-digital conversion, so as to obtain the corresponding audio energy. Specific implementations of the analog-to-digital conversion and audio energy calculation are commonly known techniques to those skilled in the art and are not described in detail in the embodiment of the present invention.

Further, it should be noted that, in the method 1, after the voice communication function of the handset is started by a user, the handset obtains the audio signals, which are input through the voice headphone and the microphone built in the mobile terminal, for processing, and thereby a current communicating microphone and a current noise reducing microphone are selected from the voice headphone and the microphone built in the mobile terminal before noise reduction is performed on the audio signal.

To ensure that the user input audio signals are not lost, after the calculating according to the sample audio signal of the voice headphone corresponding to each sampling period to obtain the one-period audio energy of the voice headphone corresponding to each sampling period and calculating according to the sample audio signal of the microphone built in the mobile terminal corresponding to each sampling period to obtain the one-period audio energy of the microphone built in the mobile terminal corresponding to each sampling period, the audio signals input by the user through the voice headphone and the microphone built in the mobile terminal need to be processed in the embodiment of the present invention. The processing is specifically as follows:

Compare one-period audio energy of the voice headphone with one-period audio energy of the microphone built in the mobile terminal corresponding to the same sampling period and determine greater one-period audio energy and smaller one-period audio energy in the one-period audio energy of the voice headphone and the one-period audio energy of the microphone built in the mobile terminal in the same sampling period; and perform voice coding according to the sample audio signal corresponding to the greater one-period audio in the one-period audio energy of the voice headphone and the one-period audio energy of the microphone built in the mobile terminal in the same sampling period to obtain the audio output signal.

In the above method, in one sampling time window, the process provided by the method needs to be carried out for every sampling period in the sampling time window to ensure that the audio signal input by the user is not lost.

Method 2: Determine a current voice communicating microphone and a current noise reducing microphone according pre-stored microphone configuration information which is used to identify the current voice communicating microphone and the current noise reducing microphone.

The pre-stored microphone configuration information may be the factory configuration of the operating system in a handset or manually set by a user and stored in the handset system. The specific setting method is not limited by the embodiment of the present invention.

102. Obtain the audio signal received by the current communicating microphone and the audio signal received by the current noise reducing microphone.

103. Perform noise reduction according to the audio signal received by the current communicating microphone and the audio signal received by the current noise reducing microphone, so as to obtain a noise reduced signal.

The noise reduction process is an audio processing process including: inverting phase of the waveform of the audio signal received by the current noise reducing microphone, superposing the phase-inverted audio signal over the audio signal received by the current communicating microphone, and performing digital filtering on the superposed audio signal. The specific implementation of the noise reduction is commonly known to those skilled in the art and are not described in detail in the embodiment of the present invention.

104. Perform voice coding according to the noise reduced signal to generate an audio output signal.

The voice coding may use waveform coding such as PCM (Pulse-code modulation, pulse-code modulation), or parameter coding such as LPC (Linear Predictive Coding, linear predictive coding), or mixed coding with waveform coding and parameter coding. The specific implementation methods of voice coding are all techniques commonly known to those skilled in the art and are not described in detail in the embodiment of the present invention.

Figure 2:
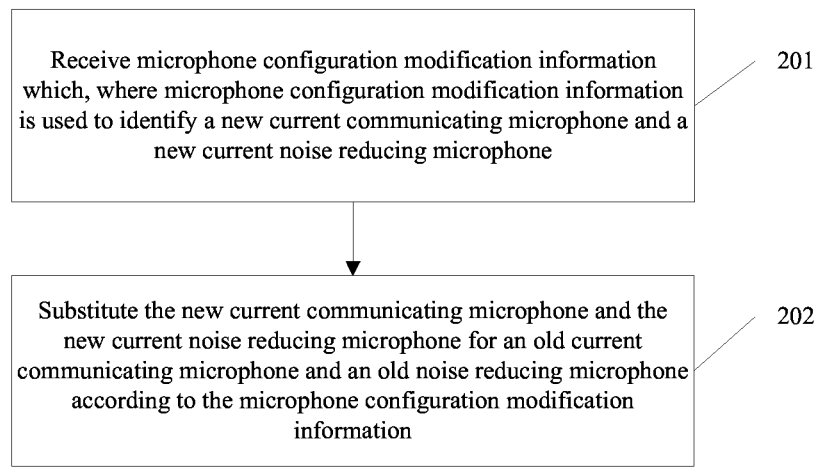
FIG. 2 is another flowchart of a method for reducing noise in voices of a mobile terminal according to Embodiment 1 of the present invention.

Further, to enhance user experience and meet the needs of voice communication in different environments, an embodiment of the present invention provides a method for modifying current microphone configuration information. As shown in FIG. 2, the method includes:

201. Receive microphone configuration modification information, where the microphone configuration modification information is used to identify a new current communicating microphone and a new current noise reducing microphone.

The microphone configuration information may be input manually by a user according to a practical need through a modification interface provided by the handset system, which may be carried out when the handset is inactive or active in a voice communication. The user may enter the modification interface by using a preset virtual function key or a physical key.

202. Substitute the new current communicating microphone and the new current noise reducing microphone for an old current communicating microphone and an old noise reducing microphone according to the microphone configuration modification information.

With the method for reducing noise in voices of a mobile terminal provided in the embodiment of the present invention, by selecting, from a voice headphone and a microphone built in the mobile terminal, a communicating microphone and a noise reducing microphone, a certain distance is produced between the communicating microphone and the noise reducing microphone, thus reducing the probability of filtering out useful voice information, ensuring the quality of voice communication and improving the effect of noise reduction.

Furthermore, the method provides a function for modifying the microphone configuration information, so that the user may define the communicating microphone and the noise reducing microphone according to a practical need, thus improving user experience.

In addition, because a voice headphone is used, it is unnecessary to embed multiple microphones in a handset, thus reducing the parts of the handset and lowering the producing cost of the handset.

Embodiment 2

Figure 3:
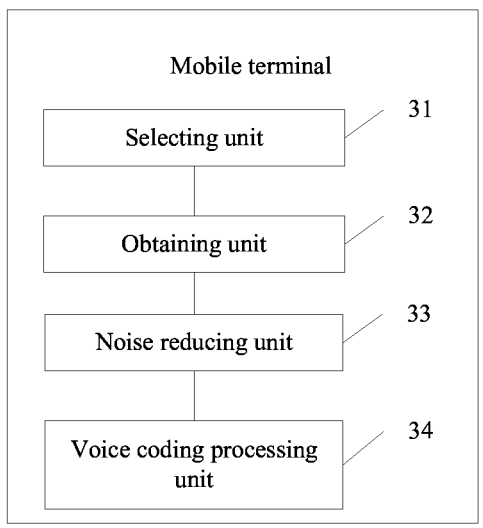
FIG. 3 is a structure diagram of a mobile terminal according to Embodiment 2 of the present invention.

The embodiment of the present invention provides a mobile terminal. As shown in FIG. 3, the apparatus includes a selecting unit 31, an obtaining unit 32, a noise reducing unit 33, and voice coding processing unit 34.

The selecting unit 31 is configured to select, from a voice headphone and a microphone built in the mobile terminal, a current communicating microphone and a current noise reducing microphone.

Figure 8:
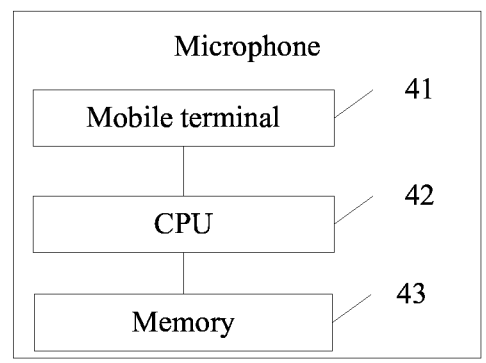
FIG. 8 is another structure diagram of a mobile terminal according to Embodiment 2 of the present invention.

The method for reducing noise in voices of a mobile terminal provided in the embodiment of the present invention may be applied to the mobile terminal shown in FIG. 8. The mobile terminal includes a microphone 41, a CPU 42 (Central Processing Unit, central processing unit), and a memory 43.

The noise reducing unit 33 is configured to perform noise reduction according to the audio signal received by the current communicating microphone and the audio signal received by the current noise reducing microphone that are obtained by the obtaining unit, so as to obtain a noise reduced signal.

The voice coding processing unit 34 is configured to perform voice coding according to the noise reduced signal generated by the noise reducing unit 33 to generate an audio output signal.

Optionally, as shown in FIG. 3, the selecting unit 31 includes a first obtaining module 311, a second obtaining module 312, a comparing module 313, and a selecting module 314.

The first obtaining module 311 is configured to obtain the audio signal received by the voice headphone and the audio signal received by the microphone built in the mobile terminal.

The second obtaining module 312 is configured to obtain the audio energy corresponding to the audio signal which is received by the voice headphone and obtained by the first obtaining module 311, and the audio energy corresponding to the audio signal, which is received by the microphone built in the mobile terminal and obtained by the first obtaining module 311.

The comparing module 313 is configured to compare the audio energy corresponding to the audio signal received by the voice headphone with the audio energy corresponding to the audio signal received by the microphone built in the mobile terminal, where the two types of audio energy are obtained by the second obtaining module 312, and determine greater audio energy and smaller audio energy in the audio energy corresponding to the audio signal received by the voice headphone and the audio energy corresponding to the audio signal received by the microphone built in the mobile terminal.

The selecting module 314 is configured to select the microphone that receives the audio signal corresponding to the greater audio energy determined by the comparing module 313 as the current communicating microphone, and select the microphone that receives the audio signal corresponding to the smaller audio energy determined by the comparing module as the current noise reducing microphone.

Figure 4:
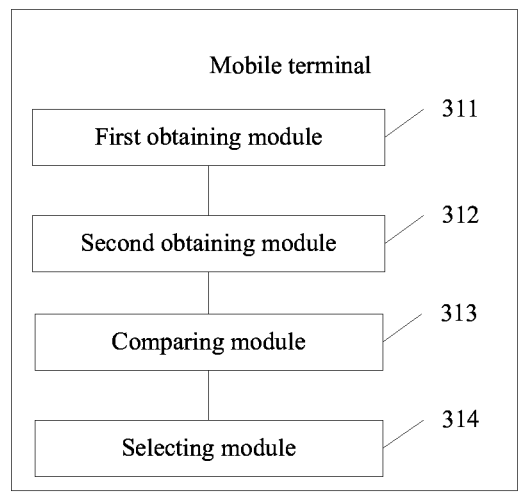
FIG. 4 is another structure diagram of a mobile terminal according to Embodiment 2 of the present invention.

Optionally, as shown in FIG. 4, the second obtaining module 312 includes an analog-to-digital converting submodule 3121, a calculating submodule 3122, and a determining submodule 3123.

The analog-to-digital converting submodule 3121 is configured to: in each sampling period in a sampling time window, perform analog-to-digital conversion on the audio signal received by the voice headphone, so as to obtain the sample audio signal of the voice headphone corresponding to each period, and perform analog-to-digital conversion on the audio signal received by the microphone built in the mobile terminal, so as to obtain the sample audio signal of the microphone built in the mobile terminal corresponding to each period, where the sampling time window includes at least one sampling period.

The calculating submodule 3122 is configured to calculate according to the sample audio signal of the voice headphone corresponding to each period generated by the analog-to-digital converting submodule 3121, so as to obtain the one-period audio energy of the voice headphone corresponding to each period, and calculate according to the sample audio signal of the microphone built in the mobile terminal corresponding to each period generated by the analog-to-digital converting submodule, so as to obtain the one-period audio energy of the microphone built in the mobile terminal corresponding to each period.

The determining submodule 3123 is configured to determine a sum of the one-period audio energy of the voice headphone corresponding to all periods obtained by the calculating submodule 3122 as the audio energy corresponding to the audio signal received by the voice headphone, and determine a sum of the one-period audio energy of the microphone built in the mobile terminal corresponding to all periods obtained by the calculating submodule as the audio energy corresponding to the audio signal received by the microphone built in the mobile terminal.

The determining submodule 3123 is configured to determine a mean value of the one-period audio energy of the voice headphone corresponding to all periods obtained by the calculating submodule 3122 as the audio energy corresponding to the audio signal received by the voice headphone, and determine a mean value of the one-period audio energy of the microphone built in the mobile terminal corresponding to all periods obtained by the calculating submodule as the audio energy corresponding to the audio signal received by the microphone built in the mobile terminal.

Optionally, the comparing module 313 is further configured to compare the one-period audio energy of the voice headphone with the one-period audio energy of the microphone built in the mobile terminal in the same sampling period, and determine greater one-period audio energy and a smaller one-period audio energy in the one-period audio energy of the voice headphone and the one-period audio energy of the microphone built in the mobile terminal in the same sampling period.

The voice coding processing unit 34 is further configured to perform voice coding according to the sample audio signal corresponding to the greater one-period audio energy in the one-period audio energy of the voice headphone and the one-period audio energy of the microphone built in the mobile terminal in the same sampling period that are obtained by the comparing module 313, so as to obtain the audio output signal.

Figure 5:
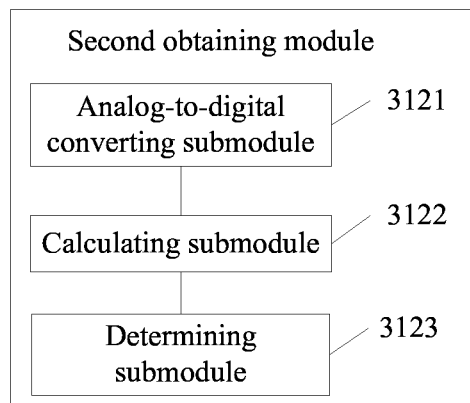
FIG. 5 is another structure diagram of a mobile terminal according to Embodiment 2 of the present invention.

Optionally, as shown in FIG. 5, the selecting unit 31 further includes a determining module 315.

The determining module 315 is configured to determine the current communicating microphone and the current noise reducing microphone according to pre-stored microphone configuration information. The pre-stored microphone configuration information is used to identify the current communicating microphone and the current noise reducing microphone.

Figure 6:
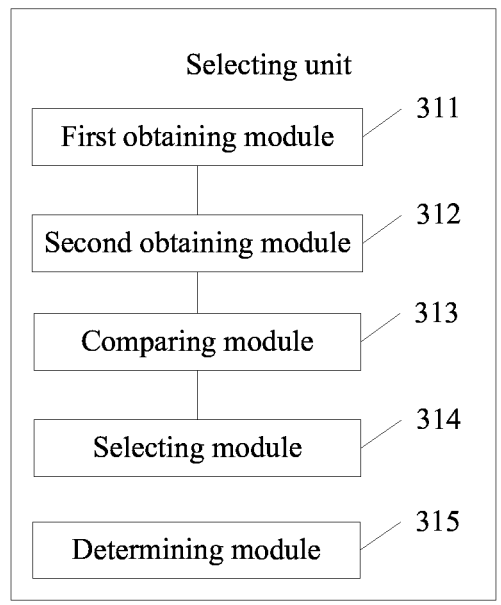
FIG. 6 is another structure diagram of a mobile terminal according to Embodiment 2 of the present invention.
Figure 7:
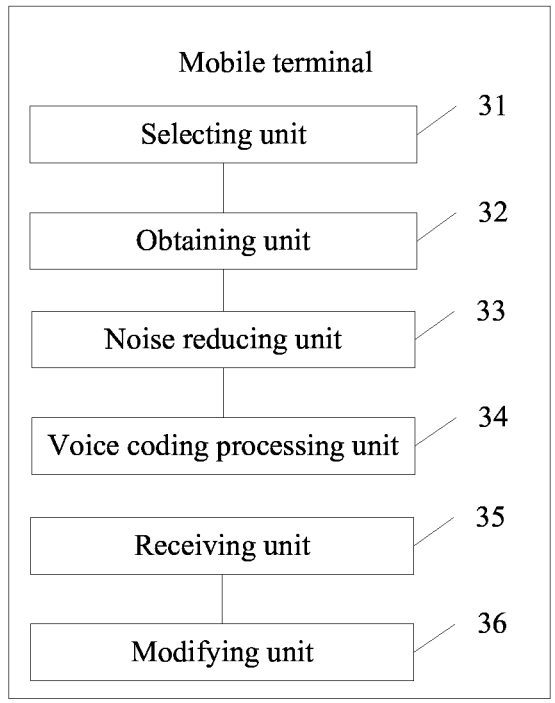
FIG. 7 is another structure diagram of a mobile terminal according to Embodiment 2 of the present invention.

Optionally, as shown in FIG. 6, the apparatus further includes a receiving unit 35 and a modifying unit 36.

The receiving unit 35 is configured to receive microphone configuration modification information which is used to identify a new current communicating microphone and a new current noise reducing microphone.

The modifying unit 36 is configured to substitute the new current communicating microphone and the new current noise reducing microphone for an old current communicating microphone and an old noise reducing microphone according to the microphone configuration modification information received by the receiving unit.

The method for reducing noise in voices of a mobile terminal provided in the embodiment of the present invention may be applied to the mobile terminal shown in FIG. 8. The mobile terminal includes a microphone 41, a CPU 42 (Central Processing Unit, central processing unit), and a memory 43.

The microphone 41 specifically includes a voice headphone and a microphone built in the mobile terminal, both of which may be used to receive voice signals sent by a user and background noise.

The CPU 42 is configured to select, from the voice headphone and the microphone built in the mobile terminal, a current communicating microphone and a current noise reducing microphone; obtain the audio signal received by the current communicating microphone and the audio signal received by the current noise reducing microphone; perform noise reduction according to the audio signal received by the current communicating microphone and the audio signal received by the current noise reducing microphone, so as to obtain a noise reduced signal; and perform voice coding according to the noise reduced signal to generate an audio output signal.

The memory 43 is configured to store the current microphone configuration, the audio signal received by the current communicating microphone and the audio signal received by the current noise reducing microphone, the noise reduced signal, and the audio output signal. The current microphone configuration includes the current voice headphone and the current microphone built in the mobile terminal.

Optionally, the CPU 42 is specifically further configured to obtain the audio signal received by the voice headphone and the audio signal received by the microphone built in the mobile terminal; obtain the audio energy corresponding to the audio signal received by the voice headphone and the audio energy corresponding to the audio signal received by the microphone built in the mobile terminal; compare the audio energy corresponding to the audio signal received by the voice headphone with the audio energy corresponding to the audio signal received by the microphone built in the mobile terminal, and determine greater audio energy and smaller audio energy in the audio energy corresponding to the audio signal received by the voice headphone and the audio energy corresponding to the audio signal received by the microphone built in the mobile terminal; and select the microphone that receives the audio signal corresponding to the greater audio energy as the current communicating microphone and the microphone that receives the audio signal corresponding to the smaller audio energy as the current noise reducing microphone. The memory 43 is specifically further configured to store the audio energy corresponding to the audio signal received by the voice headphone and the audio energy corresponding to the audio signal received by the microphone built in the mobile terminal.

Optionally, the CPU 42 is specifically further configured to: in each sampling period of a sampling time window, perform analog-to-digital conversion on the audio signal received by the voice headphone to obtain the sample audio signal of the voice headphone corresponding to each sampling period and perform analog-to-digital conversion on the audio signal received by the microphone built in the mobile terminal, so as to obtain the sample audio signal of the microphone built in the mobile terminal corresponding to each sampling period, where the sampling time window includes at least one sampling period; calculate according to the sample audio signal of the voice headphone corresponding to each sampling period to obtain the one-period audio energy of the voice headphone corresponding to each sampling period and calculate according to the sample audio signal of the microphone built in the mobile terminal corresponding to each sampling period to obtain the one-period audio energy of the microphone built in the mobile terminal corresponding to each sampling period; determine a sum of the one-period audio energy of the voice headphone corresponding to all sampling periods as the audio energy of the audio signal received by the voice headphone and determine a sum of the one-period audio energy of the microphone built in the mobile terminal corresponding to all sampling periods as the audio energy of the audio signal received by the microphone built in the mobile terminal; or determine a mean value of the one-period audio energy of the voice headphone corresponding to all sampling periods as the audio energy of the audio signal received by the voice headphone and determine a mean value of the one-period audio energy of the microphone built in the mobile terminal corresponding to all sampling periods as the audio energy of the audio signal received by the microphone built in the mobile terminal.

The memory 43 is further configured to store the one-period audio energy of the microphone built in the mobile terminal and the one-period audio energy of the voice headphone.

Optionally, the CPU 42 is specifically further configured to compare one-period audio energy of the voice headphone with one-period audio energy of the microphone built in the mobile terminal corresponding to the same sampling period, and determine greater one-period audio energy and smaller one-period audio energy in the one-period audio energy of the voice headphone and the one-period audio energy of the microphone built in the mobile terminal in the same sampling period; and perform voice coding according to the sample audio signal corresponding to the greater one-period audio energy in the one-period audio energy of the voice headphone and the one-period audio energy of the microphone built in the mobile terminal in the same sampling period, so as to obtain the audio output signal.

Optionally, the CPU 42 is specifically further configured to determine a current voice communicating microphone and a current noise reducing microphone according pre-stored microphone configuration information which is used to identify the current communicating microphone and the current noise reducing microphone.

Optionally, the CPU 42 is specifically further configured to receive microphone configuration modification information which is used to identify a new current communicating microphone and a new current noise reducing microphone; substitute the new current communicating microphone and the new current noise reducing microphone for the old current communicating microphone and the old current noise reducing microphone according to the microphone configuration modification information.

Optionally, the memory 43 is specifically further configured to store new microphone configuration information which includes the new current communicating microphone and the new noise reducing microphone.

With the mobile terminal provided in the embodiment of the present invention, by selecting, from a voice headphone and a microphone built in the mobile terminal, a communicating microphone and a noise reducing microphone, a certain distance is produced between the communicating microphone and the noise reducing microphone, thus reducing the probability of filtering out useful voice information, ensuring the quality of voice communication, and improving the effect of noise reduction.

Furthermore, the mobile terminal provides a function for modifying the microphone configuration information, so that the user may define the communicating microphone and the noise reducing microphone according to a practical need, thus improving user experience.

In addition, because a voice headphone is used, it is unnecessary to build multiple microphones in a handset, thus reducing the parts of the handset and lowering the producing cost of the handset.

Through the foregoing description of the embodiments, it is clear to persons skilled in the art that the present invention may be implemented by software plus necessary universal hardware, and definitely may also be implemented by hardware, but in many cases, the software implementation is preferred. Based on such understanding, the technical solutions of the present invention essentially, or the part contributing to the prior art may be implemented in the form of a software product. The computer software product is stored in a readable storage medium, for example, a floppy disk, hard disk, or optical disk of the computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope claimed by the claims.

What is claimed is:

1. A method for reducing noise in voices of a mobile terminal, the method comprising:
   selecting, from a voice headphone and a microphone built in the mobile terminal, a current communicating microphone and a current noise reducing microphone according to audio energy levels of audio signals received by the voice headphone and the microphone, wherein each of the audio energy levels is a sum of one-period audio energies of the respective audio signal determined from audio signals sampled in each sampling period of a sampling time window, and wherein the one of the voice headphone and the microphone that receives the audio signal corresponding to the greater audio energy is selected as the current communicating microphone and the one of the voice headphone and the microphone that receives the audio signal corresponding to the smaller audio energy is selected as the current noise reducing microphone;
   obtaining an audio signal received by the current communicating microphone and an audio signal received by the current noise reducing microphone;

performing noise reduction according to the audio signal received by the current communicating microphone and the audio signal received by the current noise reducing microphone, so as to obtain a noise reduced signal; and performing voice coding according to the noise reduced signal to generate an audio output signal.

2. The method according to claim 1, wherein selecting, the current communicating microphone and the current noise reducing microphone further comprises:

obtaining an audio signal received by the voice headphone and an audio signal received by the microphone built in the mobile terminal;

obtaining audio energy corresponding to the audio signal received by the voice headphone and audio energy corresponding to the audio signal received by the microphone built in the mobile terminal;

comparing the audio energy corresponding to the audio signal received by the voice headphone with the audio energy corresponding to the audio signal received by the microphone built in the mobile terminal; and determining greater audio energy and smaller audio energy in the audio energy corresponding to the audio signal received by the voice headphone and the audio energy corresponding to the audio signal received by the microphone built in the mobile terminal.

3. The method according to claim 2, wherein obtaining the audio energy corresponding to the audio signal received by the voice headphone and the audio energy corresponding to the audio signal received by the microphone built in the mobile terminal comprises:

in each sampling period in the sampling time window, performing analog-to-digital conversion on the audio signal received by the voice headphone, so as to obtain a sample audio signal of the voice headphone corresponding to each period, and performing analog-to-digital conversion on the audio signal received by the microphone built in the mobile terminal, so as to obtain a sample audio signal of the microphone built in the mobile terminal corresponding to each period, wherein the sampling time window comprises at least one sampling period;

calculating, according to the sample audio signal of the voice headphone corresponding to each period, to obtain the one-period audio energy of the voice headphone corresponding to each period;

calculating, according to the sample audio signal of the microphone built in the mobile terminal corresponding to each period, to obtain the one-period audio energy of the microphone built in the mobile terminal corresponding to each period; and determining the sum of the one-period audio energy of the voice headphone corresponding to all periods as the audio energy corresponding to the audio signal received by the voice headphone and determining the sum of the one-period audio energy of the microphone built in the mobile terminal corresponding to all periods as the audio energy corresponding to the audio signal received by the microphone built in the mobile terminal.

4. The method according to claim 3, after calculating according to the sample audio signal of the voice headphone corresponding to each period to obtain a one-period audio energy of the voice headphone corresponding to each period and calculating according to the sample audio signal of the microphone built in the mobile terminal corresponding to each period to obtain one-period audio energy of the microphone built in the mobile terminal corresponding to each period, further comprising:

comparing the one-period audio energy of the voice headphone with the one-period audio energy of the microphone built in the mobile terminal in the same sampling period;

determining greater one-period audio energy and smaller one-period audio energy in the one-period audio energy of the voice headphone and the one-period audio energy of the microphone built in the mobile terminal in the same sampling period; and performing voice coding according to the sample audio signal corresponding to the greater one-period audio energy in the one-period audio energy of the voice headphone and the one-period audio energy of the microphone built in the mobile terminal in the same sampling period, so as to obtain the audio output signal.

5. The method according to claim 2, wherein the obtaining an audio energy corresponding to the audio signal received by the voice headphone and an audio energy corresponding to the audio signal received by the microphone built in the mobile terminal comprises:

in each sampling period in a sampling time window, performing analog-to-digital conversion on the audio signal received by the voice headphone, so as to obtain a sample audio signal of the voice headphone corresponding to each period, and performing analog-to-digital conversion on the audio signal received by the microphone built in the mobile terminal, so as to obtain a sample audio signal of the microphone built in the mobile terminal corresponding to each period, wherein the sampling time window comprises at least one sampling period;

calculating according to the sample audio signal of the voice headphone corresponding to each period to obtain one-period audio energy of the voice headphone corresponding to each period, and calculating according to the sample audio signal of the microphone built in the mobile terminal corresponding to each period to obtain one-period audio energy of the microphone built in the mobile terminal corresponding to each period;

determining a mean value of the one-period audio energy of the voice headphone corresponding to all periods as the audio energy corresponding to the audio signal received by the voice headphone; and determining a mean value of the one-period audio energy of the microphone built in the mobile terminal corresponding to all periods as the audio energy corresponding to the audio signal received by the microphone built in the mobile terminal.

6. The method according to claim 5, after calculating according to the sample audio signal of the voice headphone corresponding to each period to obtain a one-period audio energy of the voice headphone corresponding to each period and calculating according to the sample audio signal of the microphone built in the mobile terminal corresponding to each period to obtain one-period audio energy of the microphone built in the mobile terminal corresponding to each period, further comprising:

comparing the one-period audio energy of the voice headphone with the one-period audio energy of the microphone built in the mobile terminal in the same sampling period;

determining greater one-period audio energy and smaller one-period audio energy in the one-period audio energy of the voice headphone and the one-period audio energy of the microphone built in the mobile terminal in the same sampling period; and performing voice coding according to the sample audio signal corresponding to the greater one-period audio energy in the one-period audio energy of the voice headphone and the one-period audio energy of the microphone built in the mobile terminal in the same sampling period, so as to obtain the audio output signal.

7. The method according to claim 1, wherein selecting the current communicating microphone and a current noise reducing microphone comprises:
determining a current voice communicating microphone and a current noise reducing microphone according to pre-stored microphone configuration information.

8. The method of claim 7, further comprising:
receiving microphone configuration modification information which is used to identify a new current communicating microphone and a new current noise reducing microphone; and
substituting the new current communicating microphone and the new current noise reducing microphone for an old current communicating microphone and an old noise reducing microphone according to the microphone configuration modification information.

9. A mobile terminal, comprising:
a selecting unit, configured to select, from a voice headphone and a microphone built in the mobile terminal, a current communicating microphone and a current noise reducing microphone according to audio energy levels of audio signals received by the voice headphone and the microphone, wherein each of the audio energy levels is a sum of one-period audio energies of the respective audio signal determined from audio signals sampled in each sampling period of a sampling time window, and wherein the one of the voice headphone and the microphone that receives the audio signal corresponding to the greater audio energy is selected as the current communicating microphone and the one of the voice headphone and the microphone that receives the audio signal corresponding to the smaller audio energy is selected as the current noise reducing microphone;
an obtaining unit, configured to obtain an audio signal received by the current communicating microphone selected by the selecting unit and an audio signal received by the current noise reducing microphone selected by the selecting unit;
a noise reducing unit, configured to perform noise reduction according to the audio signal received by the current communicating microphone and the audio signal received by the current noise reducing microphone that are obtained by the obtaining unit, so as to obtain a noise reduced signal; and
a voice coding processing unit, configured to perform voice coding according to the noise reduced signal generated by the noise reducing unit, so as to generate an audio output signal.

10. The mobile terminal according to claim 9, wherein the selecting unit comprises:
a first obtaining module, configured to obtain the audio signal received by the voice headphone and the audio signal received by the microphone built in the mobile terminal;
a second obtaining module, configured to obtain audio energy corresponding to the audio signal that is received by the voice headphone and obtained by the first obtaining module, and audio energy corresponding to the audio signal that is received by the microphone built in the mobile terminal and obtained by the first obtaining module; and
a comparing module, configured to compare the audio energy corresponding to the audio signal received by the voice headphone with the audio energy corresponding to the audio signal received by the microphone built in the mobile terminal, wherein the two types of audio energy are obtained by the second obtaining module, and to determine greater audio energy and smaller audio energy in the audio energy corresponding to the audio signal received by the voice headphone and the audio energy corresponding to the audio signal received by the microphone built in the mobile terminal.

11. The mobile terminal according to claim 10, wherein the second obtaining module comprises:
an analog-to-digital converting submodule, configured to, in each sampling period in the sampling time window, perform analog-to-digital conversion on the audio signal received by the voice headphone, so as to obtain a sample audio signal of the voice headphone corresponding to each period, and perform analog-to-digital conversion on the audio signal received by the microphone built in the mobile terminal, so as to obtain a sample audio signal of the microphone built in the mobile terminal corresponding to each period, wherein the sampling time window comprises at least one sampling period;
a calculating submodule, configured to calculate according to the sample audio signal of the voice headphone corresponding to each period generated by the analog-to-digital converting submodule, so as to obtain the one-period audio energy of the voice headphone corresponding to each period, and calculate according to the sample audio signal of the microphone built in the mobile terminal corresponding to each period generated by the analog-to-digital converting submodule, so as to obtain the one-period audio energy of the microphone built in the mobile terminal corresponding to each period; and
a determining submodule, configured to determine the sum of the one-period audio energy of the voice headphone corresponding to all periods obtained by the calculating submodule as the audio energy corresponding to the audio signal received by the voice headphone, and determine the sum of the one-period audio energy of the microphone built in the mobile terminal corresponding to all periods obtained by the calculating submodule as the audio energy corresponding to the audio signal received by the microphone built in the mobile terminal.

12. The mobile terminal according to claim 11, wherein the determining submodule is further configured to determine a mean value of the one-period audio energy of the voice headphone corresponding to all periods obtained by the calculating submodule as the audio energy corresponding to the audio signal received by the voice headphone, and determine a mean value of the one-period audio energy of the microphone built in the mobile terminal corresponding to all periods obtained by the calculating submodule as the audio energy corresponding to the audio signal received by the microphone built in the mobile terminal.

13. The mobile terminal according to claim 11, wherein the comparing module is further configured to compare one-period audio energy of the voice headphone with one-period audio energy of the microphone built in the mobile terminal in the same sampling period, and to determine greater one-period audio energy and smaller one-period audio energy in the one-period audio energy of the voice headphone and the one-period audio energy of the microphone built in the mobile terminal in the same sampling period; and the voice coding processing unit is further configured to perform voice coding according to the sample audio signal corresponding to the greater one-period audio energy in the one-period audio energy of the voice headphone and the one-period audio energy of the microphone built in the mobile terminal in the same sampling period that are obtained by the comparing module, so as to obtain the audio output signal.

14. The mobile terminal according to claim 9, wherein the selecting unit further comprises:
a determining module, configured to determine the current communicating microphone and the current noise reducing microphone according to pre-stored microphone configuration information, wherein the pre-stored microphone configuration information is used to identify the current communicating microphone and the current noise reducing microphone.

15. The mobile terminal according to claim 14, further comprising:
a receiving unit, configured to receive microphone configuration modification information, wherein the microphone configuration modification information is used to identify a new current communicating microphone and a new current noise reducing microphone; and
a modifying unit, configured to substitute the new current communicating microphone and the new current noise reducing microphone for an old current communicating microphone and an old noise reducing microphone according to the microphone configuration modification information received by the receiving unit.

16. A mobile terminal, comprising:
a microphone;
a processor connected to the microphone;
a non-transitory computer readable medium connected to the processor and having stored thereon instructions that, when executed, cause the processor to:
select, from a voice headphone and the microphone, a current communicating microphone and a current noise reducing microphone according to audio energy levels of first audio signals received by the voice headphone and the microphone, wherein each of the audio energy levels is a sum of one-period audio energies of the respective first audio signal determined from sample audio signals sampled in each sampling period of a sampling time window, and wherein the one of the voice headphone and the microphone that receives the one of the first audio signals corresponding to the greater audio energy is selected as the current communicating microphone and the one of the voice headphone and the microphone that receives the one of the first audio signals corresponding to the smaller audio energy is selected as the current noise reducing microphone;
obtain a second audio signal received by the current communicating microphone and a third audio signal received by the current noise reducing microphone;
perform noise reduction according to second the audio signal and the third audio signal, so as to obtain a noise reduced signal; and
perform voice coding according to the noise reduced signal, so as to generate an audio output signal.

17. The mobile terminal according to claim 16, wherein the instructions causing the processor to select a current communicating microphone and a current noise reducing microphone further comprise instructions that, when executed, cause the processor to:
obtain an audio signal received by the voice headphone and an audio signal received by the microphone;
obtain a first audio energy corresponding to the audio signal that is received by the voice headphone and obtain a second audio energy corresponding to the audio signal that is received by the microphone;
compare the first audio energy with the second audio energy; and
determine a greater audio energy and a smaller audio energy of the first audio energy and the second audio energy.

18. The mobile terminal according to claim 17, wherein the instructions causing the processor to obtain the first audio energy the second audio energy further comprise instructions that, when executed, cause the processor to:
perform analog-to-digital conversion on the audio signal received by the voice headphone in each sampling period in a sampling time window, so as to obtain a first sample audio signal of the voice headphone corresponding to each period;
perform analog-to-digital conversion on the audio signal received by the microphone by in each sampling period in the sampling time window, so as to obtain a second sample audio signal of the microphone corresponding to each period;
calculate, according to the first sample audio signal, the one-period audio energy of the voice headphone corresponding to each period;
calculate according to the second sample audio signal, the one-period audio energy of the microphone corresponding to each period;
determine the sum of the one-period audio energy of the voice headphone corresponding to all periods as the audio energy corresponding to the audio signal received by the voice headphone; and
determine the sum of the one-period audio energy of the microphone corresponding to all periods as the audio energy corresponding to the audio signal received by the microphone built in the mobile terminal;
wherein the sampling time window comprises at least one sampling period.

19. The mobile terminal according to claim 18, wherein the instructions causing the processor to compare the first audio energy with the second audio energy further comprise instructions that, when executed, cause the processor to compare a one-period audio energy of the voice headphone with a one-period audio energy of the microphone in the same sampling period;
wherein the instructions causing the processor to determine a greater audio energy and a smaller audio energy of the first audio energy and the second audio energy further comprise instructions that, when executed, cause the processor to determine a greater one-period audio energy and a smaller one-period audio energy in the one-period audio energy of the voice headphone and the one-period audio energy of the microphone in the same sampling period; and
wherein the instructions causing the processor to perform voice coding according to the noise reduced signal further comprise instructions that, when executed, cause the processor to perform voice coding according to sample audio signal corresponding to the greater one-period audio energy in the one-period audio energy of the voice headphone and the one-period audio energy of the microphone in the same sampling period, so as to obtain the audio output signal.

20. The mobile terminal according to claim 18, wherein the instructions causing the processor to determine the sum of the one-period audio energy of the voice headphone and of the microphone further comprise instructions that, when executed, cause the processor to:
- determine a mean value of the one-period audio energy of the voice headphone corresponding to all periods as the audio energy corresponding to the audio signal received by the voice headphone; and
- determine a mean value of the one-period audio energy of the microphone corresponding to all periods as the audio energy corresponding to the audio signal received by the microphone.

* * * * *